United States Patent
Fei et al.

(10) Patent No.: US 9,529,810 B2
(45) Date of Patent: Dec. 27, 2016

(54) METHODS OF SYNCHRONIZING FILES INCLUDING SYNCHRONIZED HASH MAP LINKED LISTS AND RELATED DATA PROCESSING NODES

(71) Applicant: CA, INC., Islandia, NY (US)

(72) Inventors: Gongjun Fei, Beijing (CN); Haiyang Zhang, Beijing (CN); Shaorong Li, Beijing (CN)

(73) Assignee: CA, Inc., New York, NY (US)

( * ) Notice: Subject to any disclaimer, the term of this patent is extended or adjusted under 35 U.S.C. 154(b) by 388 days.

(21) Appl. No.: 14/182,944

(22) Filed: Feb. 18, 2014

(65) Prior Publication Data

US 2015/0234712 A1    Aug. 20, 2015

(51) Int. Cl.
G06F 17/30        (2006.01)
G06F 11/14        (2006.01)

(52) U.S. Cl.
CPC ..... *G06F 17/30097* (2013.01); *G06F 11/1451* (2013.01); *G06F 17/30088* (2013.01); *G06F 17/30212* (2013.01); *G06F 11/1456* (2013.01)

(58) Field of Classification Search
CPC ............ G06F 11/1446; G06F 17/30174; G06F 17/30088; G06F 11/1451; G06F 11/1458
See application file for complete search history.

(56) References Cited

U.S. PATENT DOCUMENTS 9,229,942 B1 *    1/2016    MacNeill ............. G06F 11/1458
2011/0107274 A1 *    5/2011    Carlson ................. G06F 9/4443
                                                                  715/855

OTHER PUBLICATIONS

CA ARCserve® RHA and CA ARCserve® D2D—Working Together as an Integrated Solution; Integrated Solutions Guide, r16; Reproduced Jan. 10, 2014; http://www.arcserve.com/~/media/Files/SupportingPieces/ARCserve/ca-arcserve-rha-and-ca-arcserve-d2d-integrated-solutions-guide.pdf ; 23 pages.
Improving System and Data Protection, Recovery and Availability with CA ARCserve r16; http://www.arcserve.com/~/media/8F0D2150B0224978837524DE979A8526.ashx, retrieved from Internet Dec. 5, 2013, 22 pages.
Administration Guide, CA ARCserve® Replication and High Availability r15; http://support.ca.com/cadocs/0/CA%20ARCserve%20Replication%20and%20High%20Availability%20Option%20for%20Windows%202015-ENU/Bookshelf_Files/HTML/ADMIN/index.htm?toc.htm?678144.html; Reproduced Dec. 9, 2013, 26 pages.

* cited by examiner

*Primary Examiner* — Robert Beausoliel, Jr.
*Assistant Examiner* — Hau H Hoang
(74) *Attorney, Agent, or Firm* — Myers Bigel, P.A.

(57) ABSTRACT

Synchronizing hard link files on master and replica servers includes providing master and replica server hard link file snapshots. The master server hard link file snapshot includes a listing of hard link file names from a root directory of the master server. The replica server hard link file snapshot includes a listing of hard link file names from a root directory of the replica server. The master server hard link file snapshot and the replica server hard link file snapshot are compared. A synchronized hash map linked list may be generated responsive to the comparison. The synchronized hash map linked list includes a listing of group identifications corresponding to physical data files at the master server. For each group identification in the synchronized hash map linked list, the synchronized hash map linked list includes at least a hard link file name from the root directory of the master server.

20 Claims, 15 Drawing Sheets

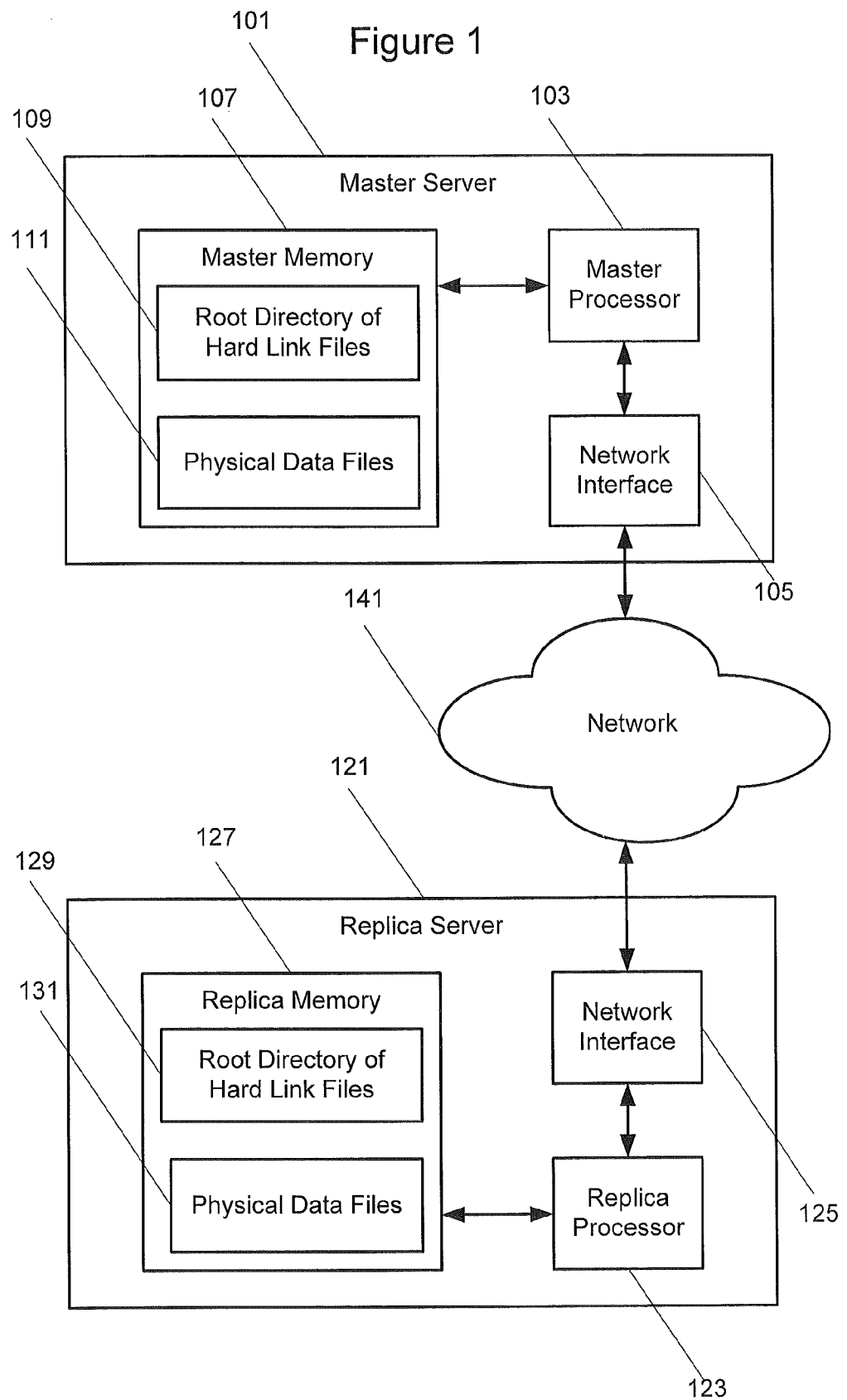

Figure 2A

| Master Server Hard Link File Snapshot | |
|---|---|
| Hard Link File | Group ID for Physical Data File (file system id, file id) |
| A.txt (LC = 3) | PhyDF-1 |
| B.txt (LC = 3) | PhyDF-1 |
| C.txt (LC = 3) | PhyDF-1 |
| D.txt (LC = 2) | PhyDF-2 |
| E.txt (LC = 2) | PhyDF-2 |
| G.txt\ (LC = 2) | PhyDF-3 |
| H.txt (LC = 2) | PhyDF-3 |

Figure 2B

| Replica Server Hard Link File Snapshot | |
|---|---|
| Hard Link File | Group ID for Physical Data File (file system id, file id) |
| A.txt (LC = 2) | PhyDF-1 |
| B.txt (LC = 2) | PhyDF-1 |
| D.txt (LC = 3) | PhyDF-2 |
| E.txt (LC = 3) | PhyDF-2 |
| F.txt (LC = 3) | PhyDF-2 |
| I.txt (LC = 2) | PhyDF-4 |
| J.txt (LC = 2) | PhyDF-4 |

Figure 3A

| Initial Master Server Hash Map Linked List | |
|---|---|
| Group ID for Physical Data File (Group ID) | Hard Link Files |
| PhyDF-1 (LC = 3) | A.txt ↔ B.txt ↔ C.txt (↺) |
| PhyDF-2 (LC = 2) | D.txt ↔ E.txt |
| PhyDF-3 (LC = 2) | G.txt ↔ H.txt |

Figure 3B

| Initial Replica Server Hash Map Linked List | |
|---|---|
| Group ID for Physical Data File (Group ID) | Hard Link Files |
| PhyDF-1 (LC = 2) | A.txt ↔ B.txt |
| PhyDF-2 (LC = 3) | D.txt ↔ E.txt ↔ F.txt (↺) |
| PhyDF-4 (LC = 2) | I.txt ↔ J.txt |

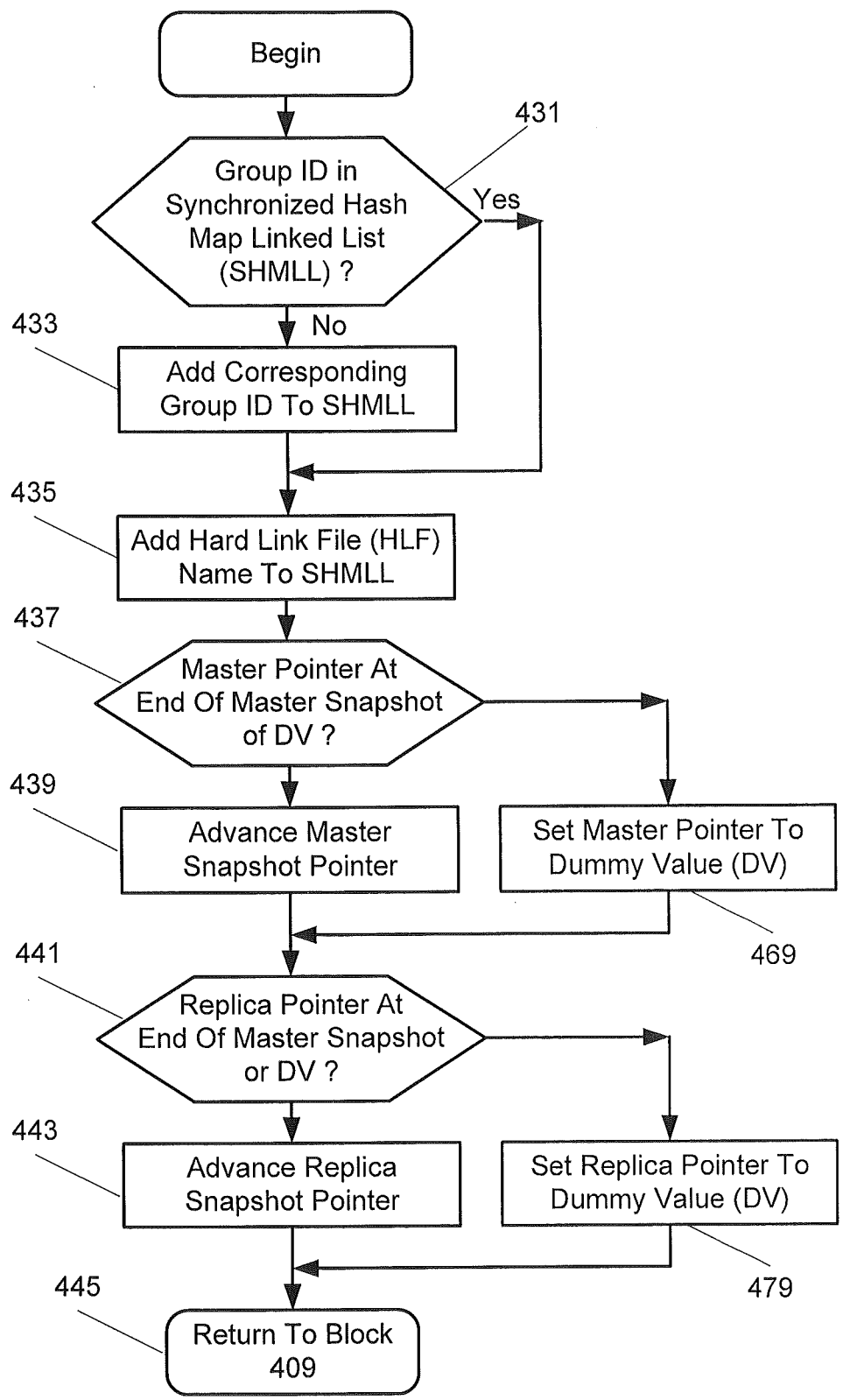

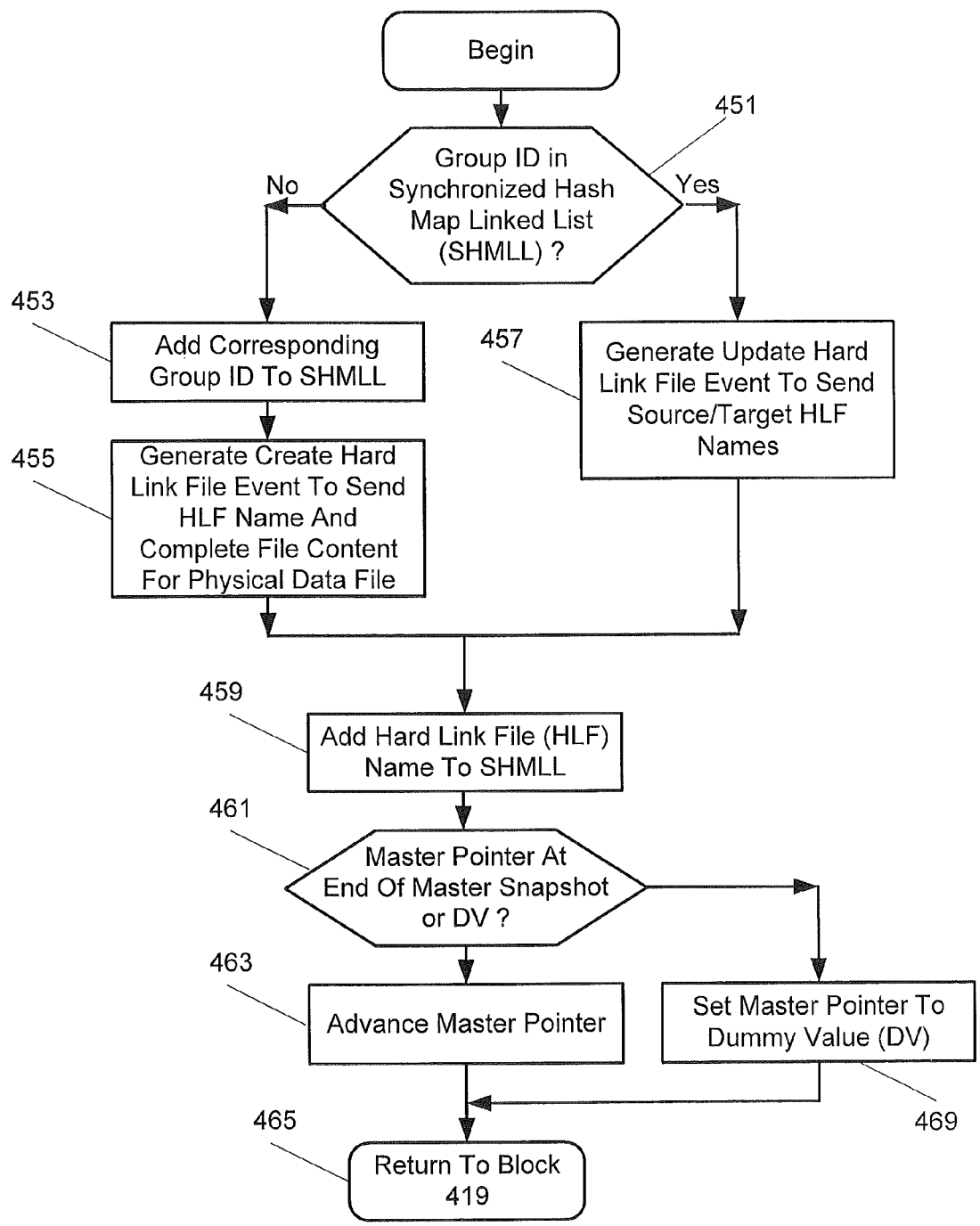

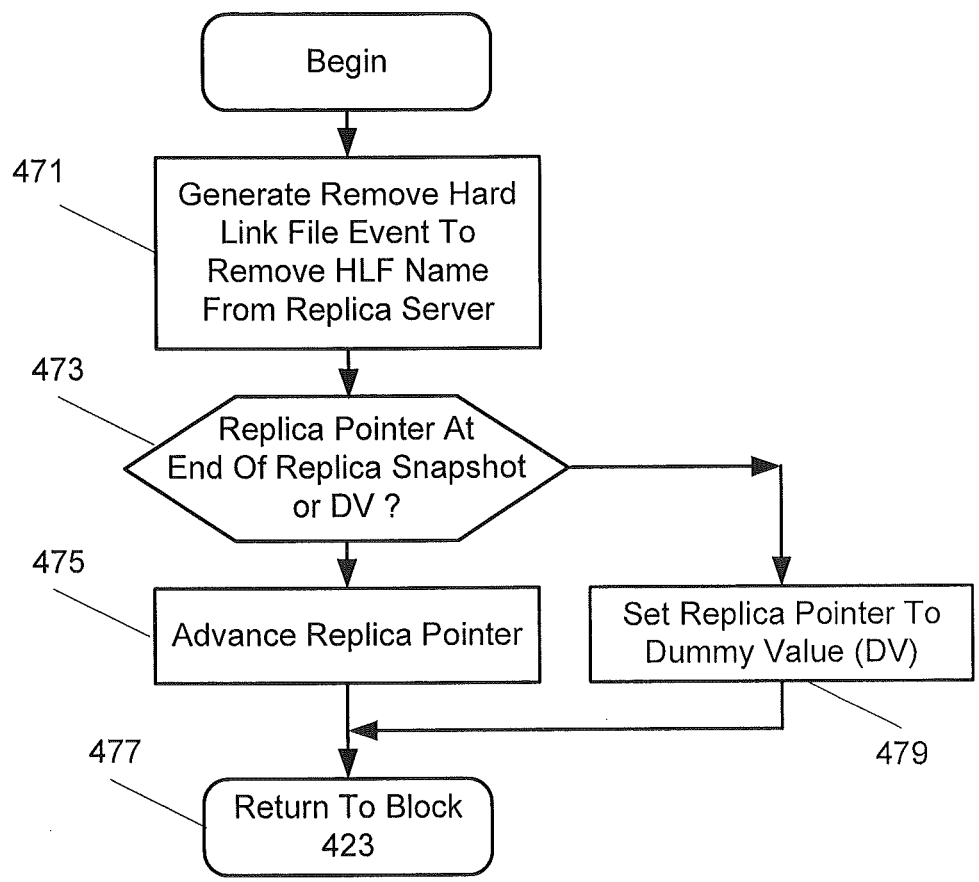

Figure 5A

| Synchronized Hash Map Linked List<br>Master Pointer to A.txt; Replica Pointer to A.txt<br>Zero Return Code (=0) For A.txt<br>Add Group ID For PhyDF-1 and Add A.txt<br>No Event Generated<br>Move Both Pointers ||
|---|---|
| Group ID for<br>Physical Data File<br>(Group ID) | Hard Link File Names |
| PhyDF-1 | A.txt |

Figure 5B

| Synchronized Hash Map Linked List<br>Master Pointer to B.txt; Replica Pointer to B.txt<br>Zero Return Code (=0) For B.txt<br>Add B.txt to Group For PhyDF-1<br>No Event Generated<br>Move Both Pointers ||
|---|---|
| Group ID for<br>Physical Data File<br>(Group ID) | Hard Link File Names |
| PhyDF-1 | A.txt ↔ B.txt |

Figure 5H

| Group ID for Physical Data File (Group ID) | Synchronized Hash Map Linked List<br>Master Pointer to H.txt; Replica Pointer to I.txt<br>Negative Return Code (<0) For H.txt<br>Add H.txt to Group for PhyDF-3<br>Generate Update Hard Link File Event<br>Neither Pointer Moves<br>Hard Link File Names |
|---|---|
| PhyDF-1 | A.txt ↔ B.txt ↔ C.txt (with loop back to A.txt) |
| PhyDF-2 | D.txt ↔ E.txt |
| PhyDF-3 | G.txt ↔ H.txt |

Figure 5G

| Group ID for Physical Data File (Group ID) | Synchronized Hash Map Linked List<br>Master Pointer to G.txt; Replica Pointer to I.txt<br>Negative Return Code (<0) For G.txt<br>Add Group ID For PhyDF-3 and Add G.txt<br>Generate Create Hard Link File Event<br>Move Only Master Pointer<br>Hard Link File Names |
|---|---|
| PhyDF-1 | A.txt ↔ B.txt ↔ C.txt (with loop back to A.txt) |
| PhyDF-2 | D.txt ↔ E.txt |
| PhyDF-3 | G.txt |

Figure 5I

| Synchronized Hash Map Linked List<br>Master Pointer to DV; Replica Pointer to I.txt<br>Positive Return Code (>0) For I.txt<br>No Change To Sync. Hash Map Linked List<br>Generate Remove Hard Link File Event<br>Move Only Replica Pointer |
|---|
| Hard Link File Names |

| Group ID for<br>Physical Data File<br>(Group ID) | Hard Link File Names |
|---|---|
| PhyDF-1 | A.txt ↔ B.txt ↔ C.txt (with loop back from C.txt to A.txt) |
| PhyDF-2 | D.txt ↔ E.txt |
| PhyDF-3 | G.txt ↔ H.txt |

Figure 5J

| Synchronized Hash Map Linked List<br>Master Pointer to DV; Replica Pointer to J.txt<br>Positive Return Code (>0) For J.txt<br>No Change To Sync. Hash Map Linked List<br>Generate Remove Hard Link File Event<br>End Of Both Lists |
|---|
| Hard Link File Names |

| Group ID for<br>Physical Data File<br>(Group ID) | Hard Link File Names |
|---|---|
| PhyDF-1 | A.txt ↔ B.txt ↔ C.txt (with loop back from C.txt to A.txt) |
| PhyDF-2 | D.txt ↔ E.txt |
| PhyDF-3 | G.txt ↔ H.txt |

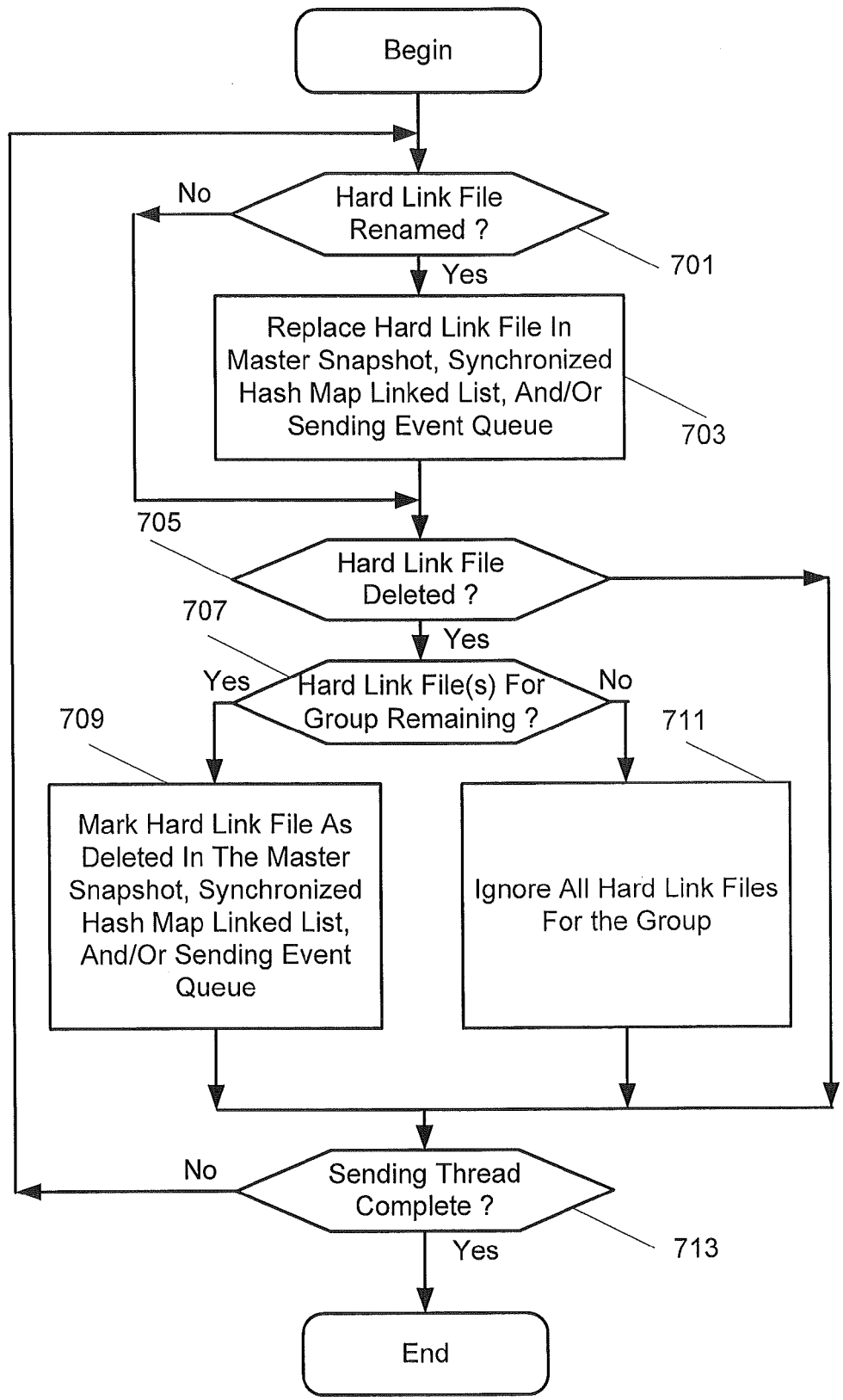

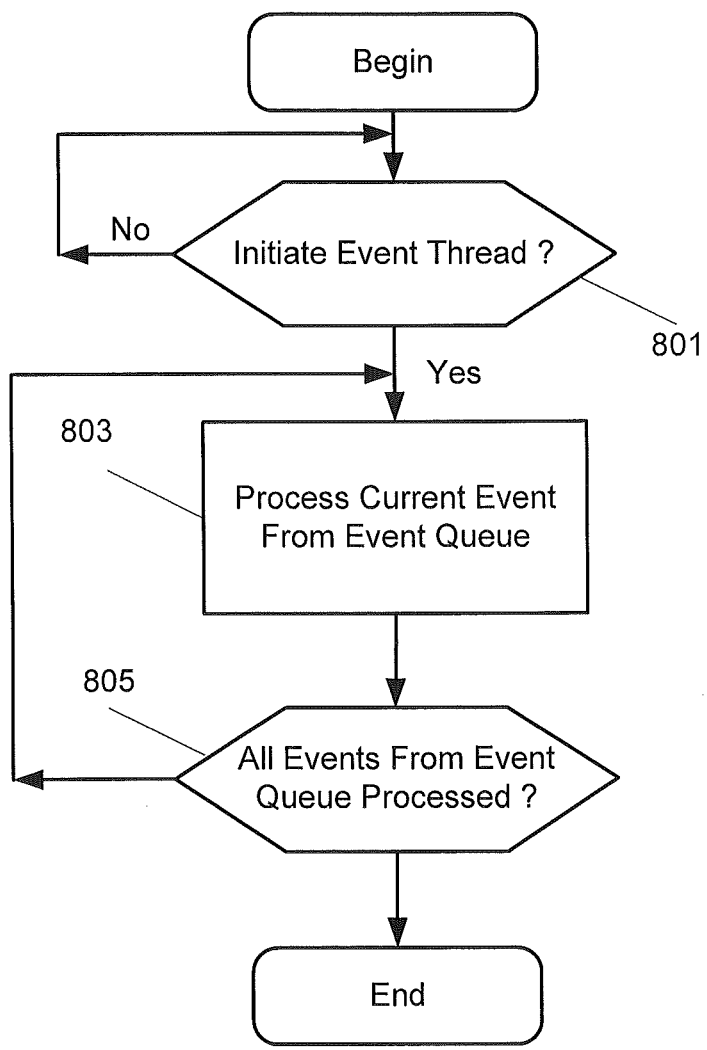

METHODS OF SYNCHRONIZING FILES INCLUDING SYNCHRONIZED HASH MAP LINKED LISTS AND RELATED DATA PROCESSING NODES

BACKGROUND

The present disclosure relates to computing systems, and, in particular, to computing systems providing data backup and related methods.

CA ARCserve Replication and High Availability (CA ARCserve RHA) and CA ARCserve D2D are designed to work together to allow a user to replicate their CA ARCserve D2D (Disk-to-Disk) backups from a local master server (also referred to as a protected server) to a replica server at an offsite location for additional security and recoverability. These CA ARCserve D2D backups can then be restored from either the local backup at the protected server or from the remote replica copy at the replica server. CA ARCserve RHA is discussed, for example, in "CA ARCserve RHA and CA ARCserve D2d, Integrated Solutions Guide, r16," copyright 2011, the disclosure of which is hereby incorporated herein in its entirety by reference.

Regarding CA ARCserve RHA, the data on the master and replica servers may need to be synchronized before beginning the replication phase. In order to synchronize data using a file-based method, files in the master server root directory and the replica server root directory may have to be traversed and sorted by file name, respectively, to generate file directory snapshots using VSS (Volume Shadow Copy Service) snapshot. Then, the two directory snapshot files may be compared to identify which file or files should be sent to the replica server.

If there are hard link files among the files with the small file size in the protected master server directory, the hard link files may be processed as normal files.

A characteristic of hard link files is that multiple hard link files may actually point to the same physical data file. Assuming that there may be millions of files, with half of the files being hard link files, a conventional replication method may send duplicated file data to the replica server without knowledge of multiple related hard link files resulting in redundant IO (input/output) operations to synchronize the data. Currently, most file systems on Windows and Unix based platforms may support hard link files. Moreover, current Windows operating systems have used hard link files for fast feature installations. When a hard link file is created or changed, the snapshot may not reflect the latest changes. Accordingly, more efficient ways to synchronize hard link files may be desired to reduce multiple transmissions of duplicated data files to the replica server and/or to improve synchronization speeds while reflecting the latest changes at the replica server.

BRIEF SUMMARY

According to some embodiments, a method of synchronizing hard link files on a master server with hard link files on a replica server may be provided. A master server hard link file snapshot including a listing of hard link file names (also referred to as hard link files) from a root directory of the master server may be provided wherein for each hard link file name in the master server hard link file snapshot, the master server hard link file snapshot includes a respective group identification for a physical data file corresponding to the hard link file name. A replica server hard link file snapshot including a listing of hard link file names from a root directory of the replica server may be provided wherein for each hard link file name in the replica server hard link file snapshot, the replica server hard link file snapshot includes a respective group identification for a physical data file corresponding to the hard link file name. The master server hard link file snapshot and the replica server hard link file snapshot may be compared. Responsive to comparing the master server hard link file snapshot and the replica server hard link file snapshot, a synchronized hash map linked list may be generated wherein the synchronized hash map linked list includes a listing of the group identifications corresponding to physical data files at the master server, and wherein for each group identification in the synchronized hash map linked list, the synchronized hash map linked list includes at least one of the hard link file names from the root directory of the master server.

Comparing may include determining that a selected hard link file name is included in the master server hard link file snapshot, that the selected hard link file name is not in the replica server hard link file snapshot, and that a group identification corresponding to the selected hard link file name is included in the synchronized hash map linked list with a previous hard link file name. Generating may include adding the selected hard link file name to the synchronized hash map linked list and generating an update hard link event including the selected hard link file name and the previous hard link file name.

Comparing may include determining that a selected hard link file name is included in the master server hard link file snapshot, that the selected hard link file name is not included in the replica server hard link file snapshot, and that a group identification corresponding to the selected hard link file name is not included in the synchronized hash map linked list. Generating may include adding the group identification corresponding to the selected hard link file name, adding the selected hard link file name to the synchronized hash map linked list, and generating a create file event including the selected hard link file name and content of an associated physical data file.

Comparing may include determining that a selected hard link file name is included in the replica server hard link file snapshot and that the selected hard link file name is not included in the master server hard link file snapshot. Generating may include generating a remove hard link file event to remove the selected hard link file name from the replica server.

Comparing may include determining that a selected hard link file name is included in both the master server hard link file snapshot and the replica server hard link file snapshot and that a group identification corresponding to the selected hard link file name is included in the synchronized hash map linked list. Generating may include adding the selected hard link file name to the synchronized hash map linked list for the group identification corresponding to the selected hard link file name.

Comparing may include determining that a selected hard link file name is included in both the master server hard link file snapshot and the replica server hard link file snapshot and that a group identification corresponding to the selected hard link file name is not included in the synchronized hash map linked list. Generating may include adding the group identification corresponding to the selected hard link file name and adding the selected hard link file name to the synchronized hash map linked list.

For each group identification in the synchronized hash map linked list, the synchronized hash map linked list may include a plurality of the hard link files names from the root directory of the master server.

Providing the master server hard link file snapshot may include providing the master server hard link file snapshot according to a lexicographical order of the hard link file names from the root directory of the master server. Providing the replica server hard link file snapshot may include providing the replica server hard link file snapshot according to a lexicographical order of the hard link file names from the root directory of the replica server. Comparing may include comparing the master server hard link file snapshot and the replica server hard link file snapshot according to the respective lexicographical orders of the respective hard link file names.

Providing the master server hard link file snapshot may include traversing the root directory of the master server using a depth first search method, and providing the replica server hard link file snapshot may include receiving the replica server hard link file snapshot from the replica server.

A first hard link file name included in the root directory of the master server may be renamed to a second hard link file name, and responsive to changing the first hard link file name to the second hard link file name in the root directory of the master server, the first hard link file name in the synchronized hash map linked list may be renamed to the second hard link file name.

Responsive to comparing the master server hard link file snapshot and the replica server hard link file snapshot, a queue of hard link file events to be transmitted to the replica server may be generated. A first hard link file name included in the root directory of the master server may be renamed to a second hard link file name. Responsive to changing the first hard link file name to the second hard link file name in the root directory of the master server, the first hard link file name in at least one of the hard link file events in the queue of hard link file events may be renamed to the second hard link file name.

According to some other embodiments, a master server may include a network interface to communicate through a data network with a replica server, a data memory comprising a root directory of hard link files and physical data files, and a processor circuit coupled to the network interface and the data memory. The processor circuit provides a master server hard link file snapshot including a listing of hard link file names from a root directory of the master server, wherein for each hard link file name in the master server hard link file snapshot, the master server hard link file snapshot includes a respective group identification for a physical data file corresponding to the hard link file name. The processor circuit provides a replica server hard link file snapshot including a listing of hard link file names from a root directory of the replica server, wherein for each hard link file name in the replica server hard link file snapshot, the replica server hard link file snapshot includes a respective group identification for a physical data file corresponding to the hard link file name. The processor circuit compares the master server hard link file snapshot and the replica server hard link file snapshot. Responsive to comparing the master server hard link file snapshot and the replica server hard link file snapshot, the processor circuit generates a synchronized hash map linked list wherein the synchronized hash map linked list includes a listing of the group identifications corresponding to physical data files at the master server, and wherein for each group identification in the synchronized hash map linked list, the synchronized hash map linked list includes at least one of the hard link file names from the root directory of the master server.

The processor circuit may compare by determining that a selected hard link file name is included in the master server hard link file snapshot, that the selected hard link file name is not in the replica server hard link file snapshot, and that a group identification corresponding to the selected hard link file name is included in the synchronized hash map linked list with a previous hard link file name. The processor circuit may generate by adding the selected hard link file name to the synchronized hash map linked list and generating an update hard link event including the selected hard link file name and the previous hard link file name.

The processor circuit may compare by determining that a selected hard link file name is included in the master server hard link file snapshot, that the selected hard link file name is not included in the replica server hard link file snapshot, and that a group identification corresponding to the selected hard link file name is not included in the synchronized hash map linked list. The processor may generate by adding the group identification corresponding to the selected hard link file name, adding the selected hard link file name to the synchronized hash map linked list, and generating a create file event including the selected hard link file name and content of an associated physical data file.

The processor circuit may compare by determining that a selected hard link file name is included in the replica server hard link file snapshot and that the selected hard link file name is not included in the master server hard link file snapshot. The processor circuit may generate a remove hard link file event to remove the selected hard link file name from the replica server.

The processor circuit may compare by determining that a selected hard link file name is included in both the master server hard link file snapshot and the replica server hard link file snapshot and that a group identification corresponding to the selected hard link file name is included in the synchronized hash map linked list. The processor circuit may generate by adding the selected hard link file name to the synchronized hash map linked list for the group identification corresponding to the selected hard link file name.

The processor circuit may compare by determining that a selected hard link file name is included in both the master server hard link file snapshot and the replica server hard link file snapshot and that a group identification corresponding to the selected hard link file name is not included in the synchronized hash map linked list. The processor circuit may generate by adding the group identification corresponding to the selected hard link file name and adding the selected hard link file name to the synchronized hash map linked list.

For each group identification in the synchronized hash map linked list, the synchronized hash map linked list may include a plurality of the hard link files names from the root directory of the master server.

The processor circuit may provide the master server hard link file snapshot according to a lexicographical order of the hard link file names from the root directory of the master server, the processor circuit may provide the replica server hard link file snapshot according to a lexicographical order of the hard link file names from the root directory of the replica server, and the processor circuit may compare the master server hard link file snapshot and the replica server hard link file snapshot according to the respective lexicographical orders of the respective hard link file names.

The processor circuit may provide the master server hard link file snapshot by traversing the root directory of the master server using a depth first search method, and the processor circuit may provide the replica server hard link file snapshot by receiving the replica server hard link file snapshot from the replica server.

The processor circuit may further rename a first hard link file name included in the root directory of the master server to a second hard link file name, and may rename the first hard link file name in the synchronized hash map linked list to the second hard link file name responsive to changing the first hard link file name to the second hard link file name in the root directory of the master server.

The processor circuit may further generate a queue of hard link file events to be transmitted to the replica server responsive to comparing the master server hard link file snapshot and the replica server hard link file snapshot, rename a first hard link file name included in the root directory of the master server to a second hard link file name, and rename the first hard link file name in at least one of the hard link file events in the queue of hard link file events to the second hard link file name responsive to changing the first hard link file name to the second hard link file name in the root directory of the master server.

BRIEF DESCRIPTION OF THE DRAWINGS

Aspects of the present disclosure are illustrated by way of example and are not limited by the accompanying figures, in which like references indicating like elements.

FIG. 1 is a block diagram illustrating master and replica servers according to some embodiments;

FIGS. 2A and 2B are respective master server and replica server hard link file snapshots according to some embodiments;

FIGS. 3A and 3B are respective master server and replica server hash map linked lists according to some embodiments;

FIGS. 4A to 4D are flow charts illustrating synchronization operations of a master server according to some embodiments;

FIGS. 5A to 5J are tables illustrating generation/processing of a synchronized hash map linked list based on master server and replica server hard link file snapshots of FIGS. 2A and 2B according to operations of FIGS. 4A to 4D;

FIG. 7 is a flow chart illustrating operations of updating hard link file names according to some embodiments; and FIG. 8 is a flow chart illustrating operations of a separate event thread according to some embodiments.

DETAILED DESCRIPTION

Figure 4A:
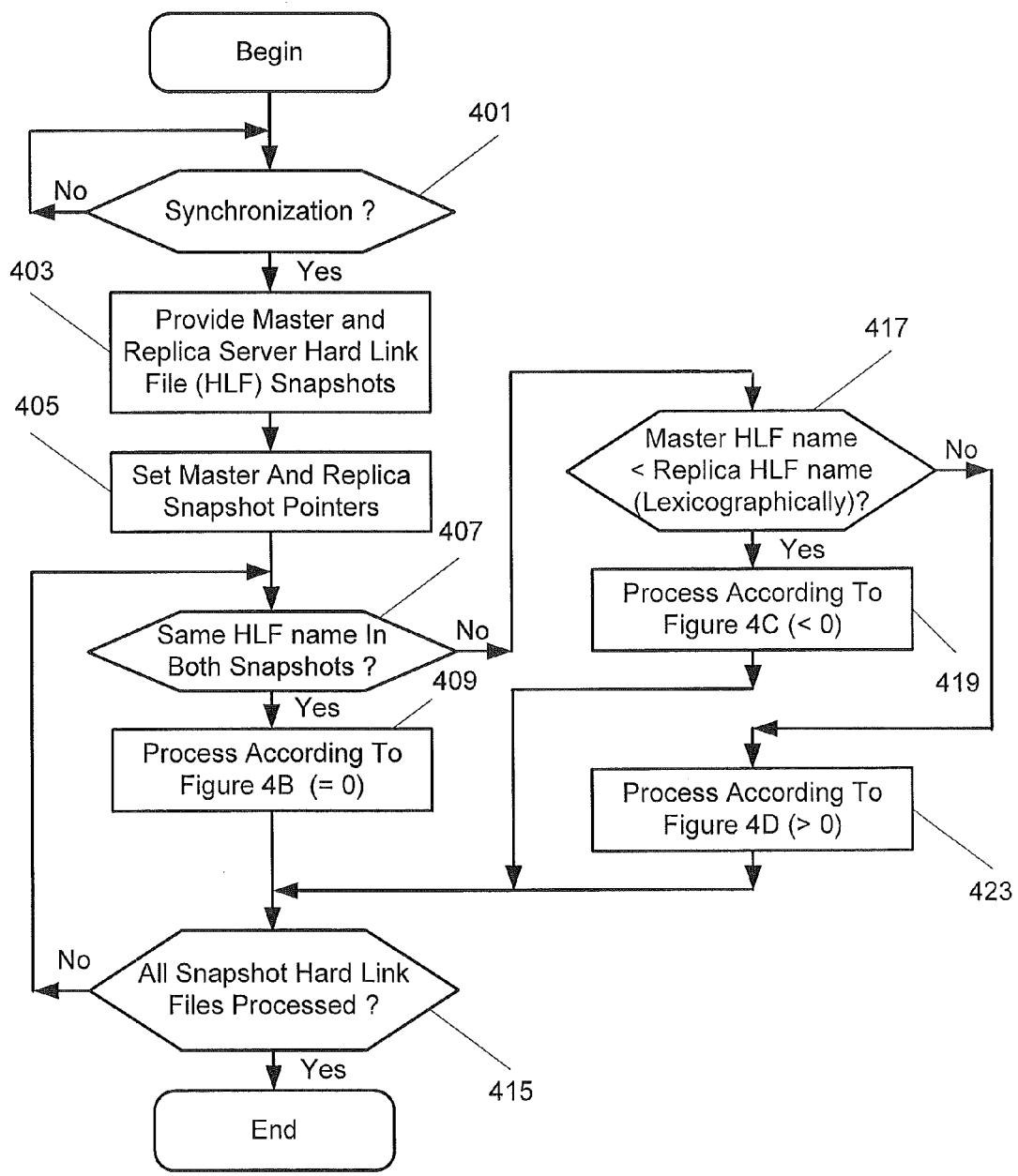

Embodiments of the present disclosure will be described more fully hereinafter with reference to the accompanying drawings. Other embodiments may take many different forms and should not be construed as limited to the embodiments set forth herein. Like numbers refer to like elements throughout.

Embodiments disclosed herein may provide more efficient ways to synchronize hard link files on master and replica servers by reducing/avoiding sending duplicated data to the replica server and/or updating hard link files during synchronization while providing/maintaining relatively high synchronization speeds. According to some embodiments disclosed herein, more efficient algorithms may be provided to synchronize hard link files on master and replica servers independent of operating system platforms, to synchronize changing hard link files, and/or to accelerate synchronization processes.

FIG. 1 is a block diagram illustrating master server 101 and replica server 121 coupled over a network 141 (e.g., the Internet, a Local Area Network or LAN, a Wide Area Network or WAN, etc.) according to some embodiments disclosed herein. As shown, master server 101 (also referred to as a data processing node) includes master processor circuit 103 coupled to network 141 through network interface 105, and master memory 107 coupled to master processor circuit 103. Master memory 107 may include a root directory of hard link files 109 (also referred to as hard link file names) and physical data files 111. Similarly, replica server 121 includes replica processor circuit 123 coupled to network 141 through network interface 125, and replica memory 127 coupled to replica processor circuit 123. Replica memory 127 may include a root directory of hard link files 129 (also referred to as hard link file names) and physical data files 131. Replica server 121 may thus be located remotely from master server 101, and replica memory 127 may be used as a backup for master memory 107.

According to some embodiments providing synchronization between master and replica root directories, master server 101 and replica server 121 first generate respective hard link file snapshots as shown in FIGS. 2A and 2B (also referred to as a master snapshot and a replica snapshot). The master and replica processor circuits 103 and 123 traverse the files in the respective root directories of hard link files 109 and 129 (e.g., using a depth first search method), and for each hard link file, a determination is made whether the link count (LC) is greater than one, respectively, e.g., using a VSS (Volume Shadow Copy Service) snapshot. The link count indicates a number of hard link files that are associated with the a physical data file. If the link count for a hard link file is greater than one, at least one other hard link file in the respective root directory is associated with the same physical data file (PhyDF). Hard link files with a link count of only 1 may be omitted from the master server and replica server hard link file snapshots according to some embodiments, so that all hard link files in the master and replica snapshots may have link counts greater than 1.

On Windows platforms, the variable nNumberOfLinks in information for a hard link file will be greater than one if the link count for that hard link file is greater than one. On Unix-like (also referred to as Unix based) platforms, the variable st_nlink in information for a hard link file will be greater than one if the link count for that hard link file is greater than one.

The unique existence of each hard link file can be identified by a 2-tuple of (volume id, file id) on a Windows platform device or by a 2-tuple of (device id, i-node id) on a UNIX based platform device. Hard link files in the respective hard link file snapshots of FIGS. 2A and 2B will be sorted lexicographically by filename, and only hard link files with associated link counts greater than one will be written to the respective hard link file snapshots. Then, each hard link file is identified by its file name and the 2-tuple (file system id, file id), independent of the operating system (OS) platform. Both master server and replica server hard link file snapshots are provided at the master server 101. For example, each server may generate its own hard link file snapshot, and replica server 121 may transmit the replica server hard link file snapshot through network 141 to master server 101.

Using the master server and replica server hard link file snapshots of FIGS. 2A and 2B, master processor circuit 103 may then create an initial master server hash map linked list for master server 101 as shown in FIG. 3A and an initial replica server hash map linked list for replica server 121 as shown in FIG. 3B. According to some other embodiments, replica server 121 may generate the initial replica server hash map linked list of FIG. 3B and then transmit the initial replica server hash map linked list over network 141 to master server 101. The initial hash map linked lists may be organized by group id and may be dynamically added to during synchronization, and each group ID may include a 2-tuple of (file system id, file id). In each hard link file snapshot, hard link files that point to a same physical data file will be linked in a same group ID (e.g., PhyDF-1, PhyDF-2, PhyDF-3, PhyDF-4, etc.) associated with that physical data file.

According to some embodiments, initial master server and replica server hash map linked lists may be used to aid in subsequent comparison operations discussed below. According to some other embodiments, the initial hash map linked lists may be omitted.

Once master processor circuit 103 has generated the master server hard link file snapshot of FIG. 2A and received the replica server hard link file snapshot of FIG. 2B from replica server 121, master processor circuit 103 may compare the hard link files of the master server and replica server hard link file snapshots.

Master processor circuit 103 may begin by reading respective initial hard link files from the master server and replica server hard link file snapshots to initiate the comparison according to a lexicographical order of the hard link files. The comparison may then proceed according to the lexicographical order of the hard link files in the respective snapshots.

According to some embodiments, three return codes (e.g., zero or =0, positive or >0, and negative or <0) may be used to represent return results for the comparisons.

For each hard link file that is included in both the master server and replica server hard link file snapshots (e.g., hard link files A.txt, B.txt, D.txt, and E.txt of FIGS. 2A and 2B), a zero return code (=0) is provided for the respective hard link file. If the Group ID corresponding to the hard link file included in both snapshots has not been previously added to the synchronized hash map linked list (SHMLL) discussed below with respect to FIGS. 5A to 5J, the Group ID is added to the synchronized hash map linked list (e.g., for hard link files A.txt and D.txt). If the corresponding Group ID has been previously added to the synchronized hash map linked list, the Group ID is not added again to the synchronized hash map linked list (e.g., for hard link files B.txt and E.txt). The hard link file is added to the synchronized hash map linked list for the corresponding Group ID. File pointers to the two hard link file snapshots are then advanced to respective next hard link files of the snapshots (according to lexicographical order). Because the hard link files are already included at both master and replica servers, an event may not be needed and/or created for execution at replica server.

For each hard link file that is included in the master server hard link file snapshot of FIG. 2A but not in the replica server hard link file snapshot of FIG. 2B (e.g., C.txt, G.txt, and H.txt), a negative return code (<0) is provided for the respective hard link file. Master processor circuit 103 determines if a group ID is currently provided for the hard link file in the synchronized hash map linked list. If a group ID for the hard link file (e.g., PhyDF-1 for C.txt or PhyDF-3 for H.txt) is already provided for the hard link file in the synchronized hash map linked list, master processor circuit 103 uses the first found hard link file name in the synchronized hash map linked list (e.g., A.txt for C.txt, or G.txt for H.txt) as its target hard link file name to generate one update hard link file event (Source Hard Link File Name→Target Hard Link File Name), and the source hard link file name (e.g., C.txt or H.txt) and target hard link file name (e.g., A.txt for C.txt, or G.txt for H.txt) are sent to the replica server. If a group ID is not currently provided for the hard link file in the synchronized hash map linked list (e.g., PhyDF-3 for G.txt), the hard link file may have to be created before creating other hard link files for this group ID, and a create hard link file event may be generated to send the complete physical data file content to replica server 121. In addition, the Group ID is added to the synchronized hash map linked list (e.g., PhyDF-3 for hard link files G.txt) if the Group ID corresponding to the hard link file has not been previously added to the synchronized hash map linked list, and the hard link file (e.g., G.txt) is added to the synchronized hash map linked list for the corresponding Group ID. Then, only the master server hard link file snapshot pointer is the moved to the next hard link file in the master server hard link file snapshot (according to lexicographical order), with the replica server hard link file snapshot pointer being maintained without change for the next comparison.

For each hard link file that is included in the replica server hard link file snapshot of FIG. 2B but not in the master server hard link file snapshot of FIG. 2A (e.g., F.txt, I.txt, and J.txt), a positive return code (>0) is provided for the respective hard link file. If a return code for a hard link file is positive, master processor circuit 103 generates a remove hard link file event to remove the hard link file from replica server 121. Then, only the replica server hard link file snapshot pointer is moved to the next hard link file in the replica server hard link file snapshot (according to lexicographical order), with the master server hard link file snapshot pointer being maintained without change for the next comparison.

These operations are repeated until the comparison of master server and replica server hard link file snapshots are complete.

To accelerate synchronization operations, all generated events may be inserted into a sending event queue that is processed by a sending thread (different than a comparison thread used for comparison operations discussed above) for transmission to replica server 121.

As discussed above there are three types of events (the create hard link file event, the update hard link file event, and the remove hard link file event), and these events are applied by replica processor circuit 123 upon receipt at replica server 121. Regarding the create hard link file event, master processor circuit 103 may transmit the corresponding physical data file content with this event (through network interface 105 and network 141), and replica processor circuit 123 may create the hard link file and physical data file with content. Regarding the update hard link file event, replica processor circuit 123 may update the hard link file pointer for the source hard link file to point to the target hard link file for the group. Regarding the remove hard link file event, replica processor circuit 123 may remove the hard link file, thereby reducing the link count at the replica server.

However, since the protected directory (i.e., root directory of hard link files of master memory 107) may change dynamically during the synchronization, a hard link file may no longer exist when sending the file content. According to some embodiments, a file filter driver may be used to catch changes in the protected directory and update the synchronized hash map file linked list. The following cases may thus be considered. When a hard link file is renamed to a new hard link file name, the hard link file name in the synchronized hash map list item may be marked/replaced by the renamed new hard link file name. Then, the new hard link file name may be read to synchronize data. When a hard link file of a group is deleted but other hard link files are left in the group, the deleted hard link file may be marked with a deleted tag and other hard link file content in the same group may be read to synchronize data. If all hard link files in a group are marked with delete tags, the hard link file content for that group may be ignored.

According to some embodiments, advantages may include: use of hard link file information to reduce/avoid transmission of duplicated synchronization data to the replica server with the knowledge of hard link file information (by sending hard link file events to the replica server to replicate data only once); comparison of hard link file snapshots to reduce redundant disk JO; increasing speed of synchronization; and/or facilitating changes in hard link files during synchronization.

Operations of master server 101 according to some embodiments will now be discussed in greater detail below with respect to the flow charts of FIGS. 4A, 4B, 4C, and 4D. Responsive to initiating synchronization at block 401 (e.g., responsive to a user command, a previously/periodically scheduled synchronization, etc.), processor circuit 103 may provide a master server hard link file (HLF) snapshot and a replica server hard link file snapshot at block 403.

The master server hard link file snapshot may include a listing of hard link file names from a root directory 109 of master server 101 as shown in FIG. 2A, where for each hard link file name in the master server hard link file snapshot, the master server hard link file snapshot includes a respective group identification for a physical data file corresponding to the hard link file name. Moreover, the hard link files of the master server hard link file snapshot may be arranged according to a lexicographical order (e.g., alpha-numeric order, alphabetical order, etc.) of the hard link files. Because the information for the master server hard link file snapshot is derived from memory 107 of master server 101, processor circuit 103 may generate the master server hard link file snapshot independently.

The replica server hard link file snapshot may include a listing of hard link file names from a root directory 129 of replica server 121 as shown in FIG. 2B, where for each hard link file name in the replica server hard link file snapshot, the replica server hard link file snapshot includes a respective group identification for a physical data file corresponding to the hard link file name. Moreover, the hard link files of the replica server hard link file snapshot may be arranged according to a lexicographical order (e.g., alpha-numeric order, alphabetical order, etc.) of the hard link files. Because the information for the replica server hard link file snapshot is derived from memory 127 of replica server 121, replica processor circuit 123 may generate the replica server hard link file snapshot and transmit the replica server hard link file snapshot through network interface 125, network 141, and network interface 105 to master processor circuit 103.

Operations of comparing the master server hard link file snapshot and the replica server hard link file snapshot are discussed below, for example, with respect to operations of blocks 405, 407, 415, 417, 431, 441, 443, 451, 461, and 463. In particular, processor circuit 103 may initially set a master snapshot pointer and a replica snapshot pointer to the first hard link files of the respective snapshots (according to the lexicographical order) at block 405. At block 407, processor circuit 103 determines whether the hard link files identified by the respective master and replica snapshot pointers are the same at block 407.

Responsive to determining that a selected hard link file name is included in both the master server hard link file snapshot and the replica server hard link file snapshot at block 407 (i.e., both master and replica snapshot pointers identify a same hard link file), processor circuit 103 may proceed to FIG. 4B at block 409 and determine whether a group identification (ID) corresponding to the selected hard link file name is included in the synchronized hash map linked list at block at block 431. Responsive to the group identification corresponding to the selected hard link file name not yet being included in the synchronized hash map linked list, processor circuit 103 may add the group identification corresponding to the selected hard link file name at block 433 and add the selected hard link file name to the synchronized hash map linked list at block 435. Responsive to the Group ID being included in the synchronized hash map linked list at block 431, processor circuit 103 may add the selected hard link file name to the synchronized hash map linked list for the group identification corresponding to the selected hard link file name at block 435 (without adding the group ID that has already been included).

After proceeding through operations of blocks 431 to 435 where the snapshot pointers have identified a hard link file included in both master and replica server hard link file snapshots, processor circuit 103 may advance master and replica snapshot pointers as discussed with respect to blocks 437 to 433. In particular, processor circuit 103 may advance the master snapshot pointer to the next hard link file (according to the lexicographical order) in the master server hard link file snapshot at block 439 unless the master snapshot pointer is at the end of the master server hard link file snapshot at block 437, and processor circuit 103 may advance the replica snapshot pointer to the next hard link file (according to the lexicographical order) in the replica server hard link file snapshot at block 443 unless the replica snapshot pointer is at the end of the replica server hard link file snapshot at block 441. At block 445, processor circuit 103 may return to block 409 of FIG. 4A. At block 415, processor circuit 103 may determine if all snapshot hard link files have been processed (i.e., all hard link files of master and replica hard link file snapshots have been processed). If all snapshot hard link files have been processed at block 415, the comparison is complete. Otherwise, a next comparison is initiated with the new pointer settings at block 407.

Responsive to determining that master and replica snapshot pointers identify different hard link files in the master and replica server hard link file snapshots at block 407, processor circuit 103 may proceed to determine which of the hard link files identified by the snapshot pointers is first according to the lexicographical order at block 417.

Responsive to determining that the hard link file identified by the master snapshot pointer has the lower lexicographical order at block 417, processor circuit 103 may determine that the hard link file identified by the master snapshot pointer is included in the master server hard link file and not in the replica server hard link file snapshot. Responsive to determining that the hard link file identified by the master snapshot pointer has the lower lexicographical order at block 417, processor circuit 103 may thus proceed to FIG. 4C at block 419 and determine at block 451 whether a group identification corresponding to the hard link file name is included in the synchronized hash map linked list with a previous hard link file name (e.g., having a lower lexicographical order).

Responsive to determining that a group identification corresponding to the selected hard link file name (identified by the master snapshot pointer) is included in the synchronized hash map linked list with a previous hard link file name at block 451, processor circuit 103 may generate an update hard link file event including the selected hard link file name and the previous hard link file name at block 457, and add the selected hard link file name to the synchronized hash map linked list at block 459. The update hard link file event may identify the source hard link file (identified by the master snapshot pointer) and the target hard link file (the other hard link file pointing to the same physical data file and having a lower lexicographical order). The update hard link file event may then be processed according to a separate sending thread to send the source and target hard link files to the replica server.

Responsive to determining that a group identification corresponding to the selected hard link file name (identified by the master snapshot pointer) is not included in the synchronized hash map linked list at block 451, processor circuit 103 may add the group identification corresponding to the selected hard link file name to the synchronized hash map linked list at block 453, generate a create hard link file event including the selected hard link file name and content of an associated physical data file at block 455, and add the selected hard link file name to the synchronized hash map linked list at block 459. The create hard link file event may then be processed according to a separate sending thread to send the hard link file name and the complete file content for the physical data file to replica server 121.

After proceeding through operations of blocks 451 to 459 where the master and replica pointers identify different hard link files with the hard link file identified by the master pointer having the lower lexicographical order, processor circuit 103 may advance master snapshot pointer as discussed with respect to blocks 461 and 463 without advancing the replica snapshot pointer. In particular, processor circuit 103 may advance the master snapshot pointer to the next hard link file (according to the lexicographical order) in the master server hard link file snapshot at block 463 unless the master snapshot pointer is at the end of the master server hard link file snapshot at block 461. At block 465, processor circuit 103 may return to block 419 of FIG. 4A. At block 415, processor circuit 103 may determine if all snapshot hard link files have been processed (i.e., all hard link files of master and replica hard link file snapshots have been processed). If all snapshot hard link files have been processed at block 415, the comparison is complete. Otherwise, a next comparison is initiated with the new pointer settings at block 407.

Responsive to determining that master and replica snapshot pointers identify different hard link files in the master and replica server hard link file snapshots at block 407, processor circuit 103 may proceed to determine which of the hard link files identified by the snapshot pointers is first according to the lexicographical order at block 417. Responsive to determining that the hard link file identified by the replica snapshot pointer has the lower lexicographical order at block 417, processor circuit 103 may determine that the hard link file identified by the replica snapshot pointer is included in the replica server hard link file and not in the master server hard link file snapshot.

Responsive to determining that the hard link file identified by the replica snapshot pointer has the lower lexicographical order at block 417, processor circuit 103 may thus proceed to FIG. 4D at block 423 and generate a remove hard link file event to remove the selected hard link file name from the replica server at block 471.

After proceeding through operations of block 471 where the master and replica pointers identify different hard link files with the hard link file identified by the replica pointer having the lower lexicographical order, processor circuit 103 may advance replica snapshot pointer as discussed with respect to blocks 473 and 475 without advancing the master snapshot pointer. In particular, processor circuit 103 may advance the replica snapshot pointer to the next hard link file (according to the lexicographical order) in the replica server hard link file snapshot at block 475 unless the replica snapshot pointer is at the end of the replica server hard link file snapshot at block 473. At block 477, processor circuit 103 may return to block 423 of FIG. 4A. At block 415, processor circuit 103 may determine if all snapshot hard link files have been processed (i.e., all hard link files of master and replica hard link file snapshots have been processed). If all snapshot hard link files have been processed at block 415, the comparison is complete. Otherwise, a next comparison is initiated with the new pointer settings at block 407.

If the master snapshot pointer is advanced past the last hard link file of the master server hard link file snapshot (e.g., H.txt of FIG. 2A) at block 439 or block 463, the master snapshot pointer may point to a dummy file having a highest possible lexicographical value to allow processing of any remaining hard link files of the replica server hard link file snapshot. Similarly, if the replica snapshot pointer is advanced past the last hard link file of the replica server hard link file snapshot (e.g., J.txt of FIG. 2B) at block 443 or block 475, the replica snapshot pointer may point to a dummy file having a highest possible lexicographical value to allow processing of any remaining hard link files of the replica server hard link file snapshot. According to such embodiments, comparison operations may be terminated at block 415 once both master and replica server hard link file snapshots point to the dummy file.

Responsive to comparing the master server hard link file snapshot and the replica server hard link file snapshot as discussed above with respect to FIGS. 4A to 4D, a synchronized hash map linked list may be generated as discussed below with respect to FIGS. 5A to 5J. A final synchronized hash map linked list (e.g., FIG. 5J) may include a listing of the group identifications corresponding to physical data files at the master server 101 at the time of the synchronization. Moreover, for each group identification in the synchronized hash map linked list, the synchronized hash map linked list may include at least one of the hard link files names from root directory 109 of master server 101. According to some embodiments, for each group identification in the synchronized hash map linked list, the synchronized hash map linked list may include a plurality of the hard link files names from root directory 109 of the master server 101.

An example of comparison of the master and replica server hard link file snapshots of FIGS. 2A and 2B according to operations of FIGS. 4A to 4D will now be discussed below with respect to FIGS. 5A to 5J. Master processor circuit 103 may generate/provide the master server hard link file snapshot of FIG. 2A and the replica server hard link file snapshot of FIG. 2B as discussed above with respect to blocks 401 and 403 of FIG. 4A. In addition, at block 405 of FIG. 4A, processor circuit 103 may initially set the master snapshot pointer at the hard link file A.txt having the lowest lexicographical value in the master snapshot, and processor circuit 103 may initially set the replica snapshot pointer at the hard link file A.txt having the lowest lexicographical value in the replica snapshot.

At block 407, the master and replica snapshot pointers initially point to the same hard link file A.txt in the respective snapshots (e.g., return code=0 for A.txt), and processor circuit 103 thus proceeds at block 409 to operations of FIG.

4B. Because the synchronized hash map linked list is initially unpopulated/empty when a comparison is initiated, the Group ID (PhyDF-1) for A.txt is not in the synchronized hash map linked list at block 431. Accordingly, processor circuit 103 adds the group ID to the synchronized hash map linked list at block 433 and adds the hard link file name A.txt to the synchronized hash map linked list at block 435 to provide the information indicated in FIG. 5A. Accordingly, no event is generated for transmission to replica server 121 because root directory 129 of replica server 121 is current with respect to A.txt.

Because neither master snapshot pointer nor replica snapshot pointer is at the end of the respective snapshot at block 437 or 441, processor circuit 103 advances both master and replica snapshot pointers to the next hard link files in the respective snapshots (e.g., B.txt in the master snapshot and B.txt in the replica snapshot). At block 445, processor circuit 103 returns to block 409 of FIG. 4A, and at block 415, processor circuit 103 returns to block 407.

At block 407, the master and replica snapshot pointers now point to the same hard link file B.txt in the respective snapshots (e.g., return code=0 for B.txt), and processor circuit 103 thus proceeds again at block 409 to operations of FIG. 4B. In this case, the Group ID PhyDF-1 is included in the synchronized hash map linked list at bloc 431, because the Group ID PhyDF-1 was added to the synchronized hash map linked list for A.txt as discussed above. Accordingly, processor circuit 103 adds the hard link file name B.txt to the synchronized hash map linked list at block 435 to provide the information indicated in FIG. 5B. Accordingly, no event is generated for transmission to replica server 121 because root directory 129 of replica server 121 is current with respect to A.txt.

Because neither master snapshot pointer nor replica snapshot pointer is at the end of the respective snapshot at block 437 or 441, processor circuit 103 advances both master and replica snapshot pointers to the next hard link files in the respective snapshots (e.g., C.txt in the master snapshot and D.txt in the replica snapshot). At block 445, processor circuit 103 returns to block 409 of FIG. 4A, and at block 415, processor circuit 103 returns to block 407.

Figure 5C:
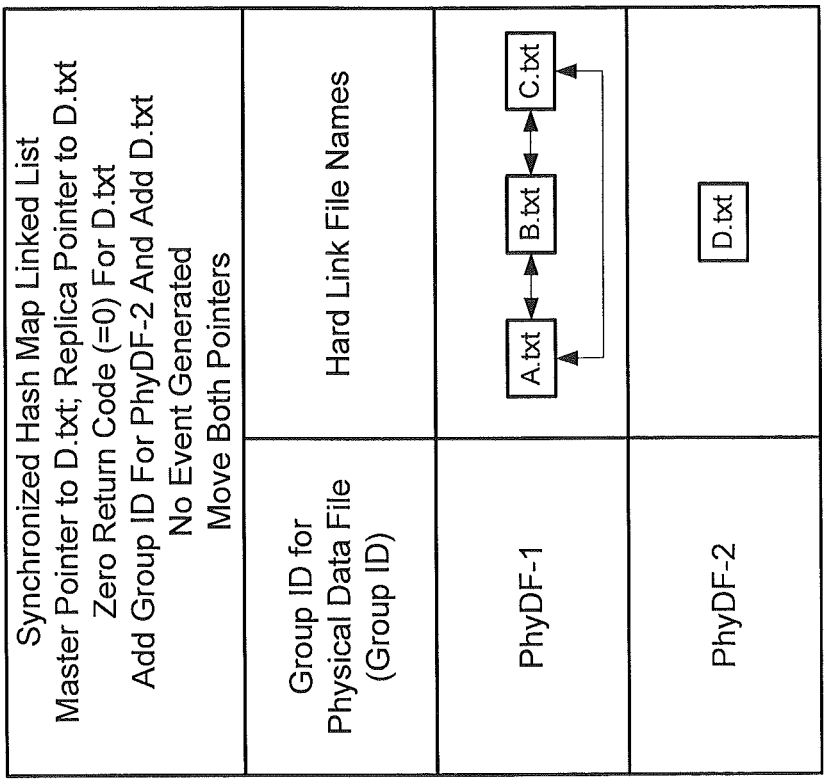
Figure 5D:
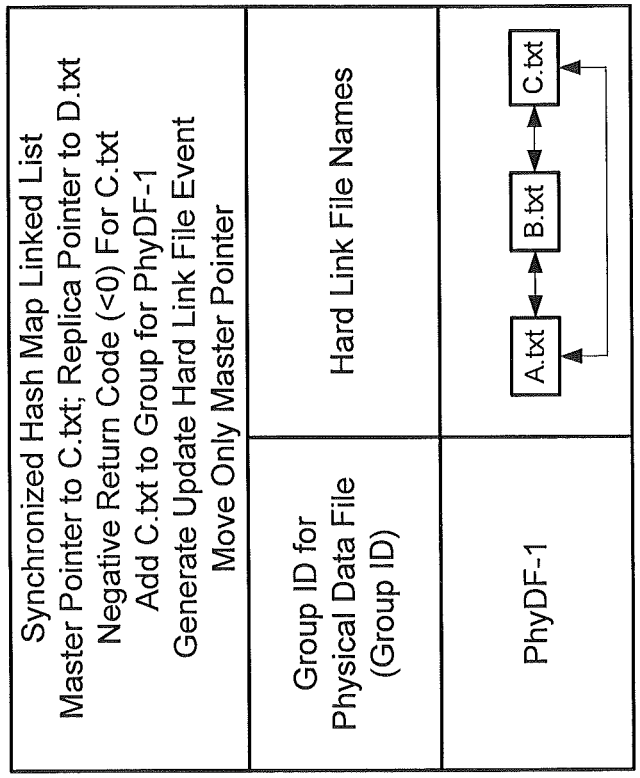
Figure 5E:
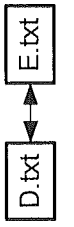

The master and replica snapshot pointers now point to different hard link files C.txt and D.txt in the respective snapshots at block 407, and the identified hard link file C.txt of the master snapshot has a lower lexicographical value at block 417 (e.g., return code <0 for C.txt). Accordingly, processor circuit 103 proceeds at block 419 to operations of FIG. 4C. At block 451, the Group ID PhyDF-1 for C.txt was previously added to synchronized hash map linked list for A.txt as discussed above. Accordingly, processor circuit 103 generates an update hard link file event for C.txt at block 457 where the update hard link file event includes the hard link file name A.txt as the target hard link file name and C.txt as the source hard link file name to indicate that C.txt is linked to A.txt. More generally, the new/source hard link file name (having the higher lexicographical value) is linked to the previous/target hard link file name for the same Group ID having the lowest lexicographical value. In addition, C.txt is added to the synchronized hash map linked list for PhyDF-1 at block 459 as shown in FIG. 5C.

Because the master snapshot pointer is not at the end of the respective snapshot at block 461, processor circuit 103 advances the master snapshot pointer to the next hard link file in the master snapshot (i.e., D.txt in the master snapshot) at block 463 while the replica snapshot pointer remains unchanged (i.e., at D.txt in the replica snapshot). At block 465, processor circuit 103 returns to block 419 of FIG. 4A, and at block 415, processor circuit 103 returns to block 407.

At block 407, the master and replica snapshot pointers now point to the same hard link file D.txt in the respective snapshots (e.g., return code=0 for D.txt), and processor circuit 103 thus proceeds at block 409 to operations of FIG. 4B. Because the Group ID PhyDF-2 for D.txt is not in the synchronized hash map linked list at block 431, processor circuit 103 adds the group ID PhyDF-2 to the synchronized hash map linked list at block 433 and adds the hard link file name D.txt to the synchronized hash map linked list at block 435 to provide the information indicated in FIG. 5D. Accordingly, no event is generated for transmission to replica server 121 because root directory 129 of replica server 121 is current with respect to D.txt.

Because neither master snapshot pointer nor replica snapshot pointer is at the end of the respective snapshot at block 437 or 441, processor circuit 103 advances both master and replica snapshot pointers to the next hard link files in the respective snapshots (e.g., E.txt in the master snapshot and E.txt in the replica snapshot) at blocks 439 and 443. At block 445, processor circuit 103 returns to block 409 of FIG. 4A, and at block 415, processor circuit returns to block 407.

At block 407, the master and replica snapshot pointers now point to the same hard link file E.txt in the respective snapshots (e.g., return code=0 for E.txt), and processor circuit 103 thus proceeds again at block 409 to operations of FIG. 4B. In this case, the Group ID PhyDF-2 is included in the synchronized hash map linked list at bloc 431, because the Group ID PhyDF-2 was added to the synchronized hash map linked list for D.txt as discussed above. Accordingly, processor circuit 103 adds the hard link file name E.txt to the synchronized hash map linked list at block 435 to provide the information indicated in FIG. 5E. Accordingly, no event is generated for transmission to replica server 121 because root directory 129 of replica server 121 is current with respect to E.txt.

Because neither master snapshot pointer nor replica snapshot pointer is at the end of the respective snapshot at block 437 or 441, both master and replica snapshot pointers are advanced to the next hard link files in the respective snapshots (e.g., G.txt in the master snapshot and F.txt in the replica snapshot) at blocks 439 and 443. At block 445, processor circuit 103 returns to block 409 of FIG. 4A, and at block 415, processor circuit returns to block 407.

Figure 5F:
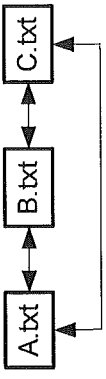

The master and replica snapshot pointers now point to different hard link files G.txt and F.txt in the respective snapshots at block 407, and the identified hard link file F.txt of the replica snapshot has a lower lexicographical value at block 417 (e.g., return code >0 for F.txt) at block 417. Accordingly, processor circuit 103 proceeds at block 423 to operations of FIG. 4D. At block 471, processor circuit 103 generates a remove hard link file event for F.txt to remove hard link file F.txt from root directory 129 of replica server 121. Information in the synchronized hash map linked list, however, remains unchanged as shown in FIG. 5F.

Because the replica snapshot pointer is not at the end of the replica snapshot at block 473, processor circuit 103 advances the replica snapshot pointer to the next hard link file in the replica snapshot (i.e., I.txt in the replica snapshot) at block 475 while the master snapshot pointer remains unchanged (i.e., at G.txt in the master snapshot). At block 477, processor circuit returns to block 423 of FIG. 4A, and at block 415, processor circuit returns to block 407.

The master and replica snapshot pointers now point to different hard link files G.txt and I.txt in the respective snapshots at block 407, and the identified hard link file G.txt of the master snapshot has a lower lexicographical value at block 417 (e.g., return code <0 for G.txt). Accordingly, processor circuit 103 proceeds at block 419 to operations of FIG. 4C. At block 451, the Group ID PhyDF-3 for G.txt is not currently included in the synchronized hash map linked list. Accordingly, processor circuit 103 adds the Group ID PhyDF-3 to the synchronized hash map linked list at block 453, processor circuit 103 generates a create hard link file event to send the hard link file name G.txt and complete file content for the associated physical data file to replica server 121 at block 455, and processor circuit 103 adds the hard link file name G.txt to the synchronized hash map linked list at block 459, as shown in FIG. 5G.

Because the master snapshot pointer is not at the end of the respective snapshot at block 461, processor circuit 103 advances the master snapshot pointer to the next hard link file in the master snapshot (i.e., H.txt in the master snapshot) at block 463 while the replica snapshot pointer remains unchanged (i.e., at I.txt in the replica snapshot). At block 465, processor circuit 103 returns to block 419 of FIG. 4A, and at block 415, processor circuit 103 returns to block 407.

The master and replica snapshot pointers now point to different hard link files H.txt and I.txt in the respective snapshots at block 407, and the identified hard link file H.txt of the master snapshot has a lower lexicographical value at block 417 (e.g., return code <0 for H.txt). Accordingly, processor circuit 103 proceeds at block 419 to operations of FIG. 4C. At block 451, the Group ID PhyDF-3 for H.txt is included in the synchronized hash map linked list as discussed above with respect FIG. 5G. Accordingly, processor circuit 103 generates an update hard link file event to send the source/target hard link file names to replica server 121 at block 457, and processor circuit 103 adds the hard link file name H.txt to the synchronized hash map linked list at block 459, as shown in FIG. 5H.

Because the master snapshot pointer is at the end of the respective snapshot at block 461, processor circuit 103 may set the master snapshot pointer to a dummy value having a highest lexicographical value at block 469. During subsequent comparison operations, processor circuit 103 may maintain the master snapshot pointer set at the dummy value to allow processing of any unprocessed hard link files in the replica snapshot. At block 465, processor circuit 103 returns to block 419 of FIG. 4A, and at block 415, processor circuit 103 returns to block 407.

At this point, the master snapshot pointer points to the dummy value (DV) and the replica snapshot pointer point to hard link file I.txt in the respective snapshots at block 407, and the identified hard link file I.txt of the replica snapshot has a lower lexicographical value at block 417 (e.g., return code >0 for I.txt). Accordingly, processor circuit 103 proceeds at block 423 to operations of FIG. 4D. At block 471, processor circuit 103 generates a remove hard link file event for I.txt at block 471 to remove hard link file I.txt from root directory 129 of replica server 121. Information in the synchronized hash map linked list, however, remains unchanged as shown in FIG. 5I.

Because the replica snapshot pointer is not at the end of the replica snapshot at block 473, processor circuit 103 advances the replica snapshot pointer to the next hard link file in the replica snapshot (i.e., I.txt in the replica snapshot) at block 475 while the master snapshot pointer remains unchanged (i.e., at the dummy value). At block 477, processor circuit 103 returns to block 423 of FIG. 4A, and at block 415, processor circuit 103 returns to block 407.

At this point, the master snapshot pointer points to the dummy value (DV) and the replica snapshot pointer points to hard link file J.txt in the respective snapshots at block 407, and the identified hard link file J.txt of the replica snapshot has a lower lexicographical value at block 417 (e.g., return code >0 for J.txt) at block 417. Accordingly, processor circuit 103 proceeds at block 423 to operations of FIG. 4D. At block 471, processor circuit 103 generates a remove hard link file event for I.txt to remove hard link file I.txt from root directory 129 of replica server 121. Information in the synchronized hash map linked list, however, remains unchanged as shown in FIG. 5J.

Because the replica snapshot pointer is at the end of the replica snapshot at block 473, processor circuit 103 sets the replica snapshot pointer to the dummy value at block 479 while the master snapshot pointer remains unchanged (i.e., at the dummy value). At block 477, processor circuit 103 returns to block 423 of FIG. 4A. At block 415, processor circuit 103 determines that all snapshot hard link files have been processed because both master and replica snapshot pointers now point to the dummy value.

The order of operations discussed above with respect to FIGS. 5A to 5J is provided by way of example to illustrate synchronization operations using the master and replica snapshots of FIGS. 2A and 2B. Accordingly, it will be understood that different orders of operations of FIGS. 4A to 4D would result using different master and replica snapshots. Accordingly, master snapshot pointer may reach the end of the master snapshot at any one of operations 437/469 of FIG. 4B or operations 461/469 of FIG. 4C, and replica snapshot pointer may reach the end of the replica snapshot at any one of operations 441/479 of FIG. 4B or operations 473/479 of FIG. 4D.

Figure 6:
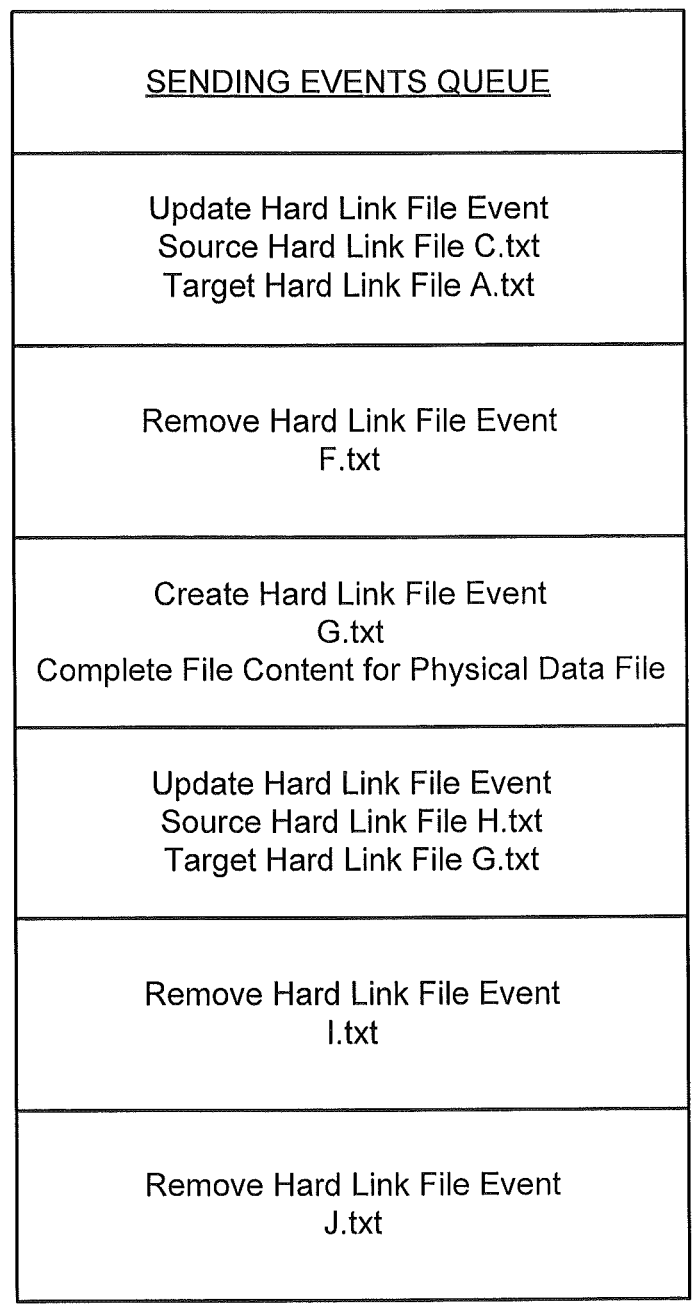
FIG. 6 is a sending events queue generated according to operations of FIGS. 4A to 4D and 5A to 5J.

Accordingly, processor circuit 103 may perform operations of FIGS. 4A to 4D according to a comparison thread (also referred to as a synchronization thread) to generate a synchronized hash map linked list (e.g., synchronized hash map linked list of FIG. 5J) and possibly one or more events (e.g., one or more of an update hard link file event(s), a create hard link file event(s), and/or a remove hard link file event) for transmission to replica server 121. Processor circuit 103 may use a separate sending thread to process the events generated by the comparison thread. According to operations discussed above with respect to FIGS. 5A to 5J, for example, processor circuit 103 generated the following events illustrated in the Sending Events Queue of FIG. 6: update hard link file event for source hard link file C.txt (including target hard link file A.txt) of FIG. 5C; remove hard link file event for hard link file F.txt of FIG. 5F; create hard link file event for hard link file G.txt (including complete file content for respective physical data file of FIG. 5G; update hard link file event for hard link file H.txt (including target hard link file G.txt) of FIG. 5H; remove hard link file event for hard link file I.txt; and remove hard link file event for hard link file J.txt.

To accelerate synchronization operations may thus be accelerated by inserting all events generated during synchronization into the Sending Events Queue that is processed by a sending thread (different than a comparison thread used for comparison operations discussed above) for transmission to replica server 121. As discussed above there are three types of events (the create hard link file event, the update hard link file event, and the remove hard link file event), and these events are applied by replica processor circuit 123 upon receipt at replica server 121. Regarding the create file event, master processor circuit 103 may transmit the corresponding physical data file content with this event (through network interface 105 and network 141), and replica processor circuit 123 may create the hard link file and physical data file with content. Regarding the update hard link file event, replica processor circuit 123 may update the hard link file pointer for the source hard link data file to point to the target/initial hard link file for the group. Regarding the remove hard link file event, replica processor circuit 123 may remove the hard link file, thereby reducing the link count at the replica server.

Because the protected directory (i.e., root directory of hard link files of master memory 107) may change dynamically during the synchronization discussed above with respect to FIGS. 4A to 4D and 5A to 5D, a hard link file may no longer exist when the sending thread actually sends the event including the file and/or content. According to some embodiments, a file filter driver may be used to catch changes in the protected directory and update the synchronized hash map file linked list. The following cases may thus be considered. When a hard link file is renamed to a new hard link file name, the hard link file name in the synchronized hash map list item may be marked/replaced by the renamed new hard link file name. Then, the new hard link file name may be read to synchronize data. When a hard link file of a group is deleted but other hard link files are left in the group, the deleted hard link file may be marked with a deleted tag and other hard link file content in the same group may be read to synchronize data. If all hard link files in a group are marked with delete tags, the hard link file content for that group may be ignored.

According to some embodiments, a file filter driver may be implemented by processor circuit 103 according to operations discussed below with respect to FIG. 7. More particularly, processor circuit 103 may perform operations of FIG. 7 during synchronization operations of the comparison thread and/or during operations of the sending thread. If a hard link file is renamed at block 701, processor circuit 103 may replace the hard link file name with the new name in the master snapshot, the synchronized hash map linked list, and/or the sending event queue at block 703. If a hard link file is deleted at block 705 and there are other hard link files for the group remaining at block 707, processor circuit 103 may mark the hard link file as deleted in the master snapshot, the synchronized hash map linked list, and/or the sending event queue at block 709. If a hard link file is deleted at block 705 and all other hard link files for the group are marked deleted block 707, processor circuit 103 may ignore all hard link files for the group at block 711. Moreover, operations of FIG. 7 may be repeated at bock 713 until the sending thread is complete.

FIG. 8 is a flow chart illustrating operations of a sending thread according to some embodiments. For example, processor circuit 103 may initiate the sending thread at block 801 responsive to completion of the comparison thread discussed above with respect to FIGS. 4A to 4D, or processor circuit 103 may initiate the sending thread at block 801 while the comparison thread is running. At blocks 803 and 805, processor circuit 103 may sequentially process each of the events of the Event Queue of FIG. 6 until all events have been processed. If a hard link file associated with an event has been renamed as discussed above with respect to FIG. 7 when that event is the current event for processing at block 803, processor circuit 103 may process the event using the new name of the hard link file. If the source hard link file for an update hard link file event (e.g., hard link file C.txt of FIG. 6) has been deleted when the update hard link file is the current event for processing at block 803, the update hard link event may be disregarded. If the hard link file for a create hard link file event has been deleted when the create hard link file event is the current event for processing at block 803 and not other hard link files are associate with the corresponding physical data file, the create hard link file event may be disregarded. If the first hard link file for a create hard link file event (e.g., G.txt) has been deleted when the create hard link file event is the current event for processing at block 803 and a second hard link file (e.g., H.txt) is included in an update hard link file event targeting the deleted hard link file, the create hard link file event may be processed for the second hard link file at block 803 and the update hard link file event may be disregarded.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of synchronizing hard link files on a master server with hard link files on a replica server, wherein the master server and the replica server are coupled over a data network, the method comprising:

providing a master server hard link file snapshot including a listing of hard link file names from a root directory of the master server, wherein for each hard link file name in the master server hard link file snapshot, the master server hard link file snapshot includes a respective group identification for a physical data file corresponding to the hard link file name, wherein the listing includes first and second hard link file names from the root directory of the master server, wherein master server hard link file snapshot includes a first group identification for a first physical data file corresponding to the first hard link file name, wherein the master server hard link file snapshot includes a second group identification for a second physical data file corresponding to the second hard link file name, wherein the first and second group identifications are different, and wherein the first and second physical data files are different;

receiving a replica server hard link file snapshot including a listing of hard link file names from a root directory of the replica server, wherein the replica server hard link file snapshot is received over the data network from the replica server, wherein for each hard link file name in the replica server hard link file snapshot, the replica server hard link file snapshot includes a respective group identification for a physical data file corresponding to the hard link file name;

comparing the master server hard link file snapshot and the replica server hard link file snapshot; and responsive to comparing the master server hard link file snapshot and the replica server hard link file snapshot, generating a synchronized hash map linked list wherein the synchronized hash map linked list includes a listing of the group identifications corresponding to physical data files at the master server, wherein the listing of group identifications of the synchronized hash map linked list includes the first and second group identifications, and wherein for each group identification in the synchronized hash map linked list, the synchronized hash map linked list includes at least one of the hard link file names from the root directory of the master server.

2. The method of claim 1 wherein comparing comprises determining that a selected hard link file name is included in the master server hard link file snapshot, that the selected hard link file name is not in the replica server hard link file snapshot, and that a group identification corresponding to the selected hard link file name is included in the synchronized hash map linked list with a previous hard link file name, and wherein generating comprises adding the selected hard link file name to the synchronized hash map linked list and generating an update hard link event including the selected hard link file name and the previous hard link file name, the method further comprising:
transmitting the update hard link event over the network to the replica server.

3. The method of claim 1 wherein comparing comprises determining that a selected hard link file name is included in the master server hard link file snapshot, that the selected hard link file name is not included in the replica server hard link file snapshot, and that a group identification corresponding to the selected hard link file name is not included in the synchronized hash map linked list, and wherein generating comprises adding the group identification corresponding to the selected hard link file name, adding the selected hard link file name to the synchronized hash map linked list, and generating a create file event including the selected hard link file name and content of an associated physical data file, the method further comprising:
transmitting the create file event including the selected hard link file name and the content of the associated physical data file over the network to the replica server.

4. The method of claim 1 wherein comparing comprises determining that a selected hard link file name is included in the replica server hard link file snapshot and that the selected hard link file name is not included in the master server hard link file snapshot, and wherein generating comprises generating a remove hard link file event to remove the selected hard link file name from the replica server, the method further comprising:
transmitting the remove hard link file event over the network to the replica server.

5. The method of claim 1 wherein comparing comprises determining that a selected hard link file name is included in both the master server hard link file snapshot and the replica server hard link file snapshot and that a group identification corresponding to the selected hard link file name is included in the synchronized hash map linked list, and wherein generating includes adding the selected hard link file name to the synchronized hash map linked list for the group identification corresponding to the selected hard link file name.

6. The method of claim 1 wherein comparing comprises determining that a selected hard link file name is included in both the master server hard link file snapshot and the replica server hard link file snapshot and that a group identification corresponding to the selected hard link file name is not included in the synchronized hash map linked list, and wherein generating includes adding the group identification corresponding to the selected hard link file name and adding the selected hard link file name to the synchronized hash map linked list.

7. The method of claim 1 wherein providing the master server hard link file snapshot comprises traversing the root directory of the master server using a depth first search method.

8. The method of claim 1 further comprising:
renaming the first hard link file name included in the root directory of the master server to a third hard link file name; and
responsive to changing the first hard link file name to the third hard link file name in the root directory of the master server, renaming the first hard link file name in the synchronized hash map linked list to the third hard link file name.

9. The method of claim 1 further comprising:
responsive to comparing the master server hard link file snapshot and the replica server hard link file snapshot, generating a queue of hard link file events to be transmitted to the replica server;
renaming the first hard link file name included in the root directory of the master server to a third hard link file name;
responsive to changing the first hard link file name to the third hard link file name in the root directory of the master server, renaming the first hard link file name in at least one of the hard link file events in the queue of hard link file events to the third hard link file name; and
transmitting the queue of hard link file events over the data network to the replica server.

10. The method of claim 1 wherein the replica server hard link file snapshot includes at least one of the first group identification and/or the second group identification.

11. The method of claim 1 wherein the master server hard link file snapshot is provided at a processor of the master server, wherein the replica server hard link file snapshot is received over the network through a network interface at the processor, wherein comparing comprises the processor comparing the master server hard link file snapshot and the replica server hard link file snapshot, and wherein generating comprises the processor generating the synchronized hash map linked list.

12. A data processing node comprising:
a network interface to communicate through a data network with a replica server;
a data memory comprising a root directory of hard link files and physical data files; and
a processor circuit coupled to the network interface and the data memory, the processor circuit being,
to provide a master server hard link file snapshot including a listing of hard link file names from a root directory of the master server, wherein for each hard link file name in the master server hard link file snapshot, the master server hard link file snapshot includes a respective group identification for a physical data file corresponding to the hard link file name, wherein the listing includes first and second hard link file names from the root directory of the master server, wherein master server hard link file snapshot includes a first group identification for a first physical data file corresponding to the first hard link file name, wherein the master server hard link file snapshot includes a second group identification for a second physical data file corresponding to the second hard link file name, wherein the first and second group identifications are different, and wherein the first and second physical data files are different, to receive a replica server hard link file snapshot including a listing of hard link file names from a root directory of the replica server, wherein the replica server hard link file snapshot is received at the processor over the data network from the replica server through the network interface, wherein for each hard link file name in the replica server hard link file snapshot, the replica server hard link file snapshot includes a respective group identification for a physical data file corresponding to the hard link file name, to compare the master server hard link file snapshot and the replica server hard link file snapshot, and responsive to comparing the master server hard link file snapshot and the replica server hard link file snapshot, to generate a synchronized hash map linked list wherein the synchronized hash map linked list includes a listing of the group identifications corresponding to physical data files at the master server, wherein the listing of group identifications of the synchronized hash map linked list includes the first and second group identifications, and wherein for each group identification in the synchronized hash map linked list, the synchronized hash map linked list includes at least one of the hard link file names from the root directory of the master server.

13. The data processing node of claim 12 wherein the processor circuit compares by determining that a selected hard link file name is included in the master server hard link file snapshot, that the selected hard link file name is not in the replica server hard link file snapshot, and that a group identification corresponding to the selected hard link file name is included in the synchronized hash map linked list with a previous hard link file name, and wherein the processor generates by adding the selected hard link file name to the synchronized hash map linked list and generating an update hard link event including the selected hard link file name and the previous hard link file name, the processor further being, to transmitting the update hard link event through the network interface over the network to the replica server.

14. The data processing node of claim 12 wherein the processor circuit compares by determining that a selected hard link file name is included in the master server hard link file snapshot, that the selected hard link file name is not included in the replica server hard link file snapshot, and that a group identification corresponding to the selected hard link file name is not included in the synchronized hash map linked list, and wherein the processor circuit generates by adding the group identification corresponding to the selected hard link file name, adding the selected hard link file name to the synchronized hash map linked list, and generating a create file event including the selected hard link file name and content of an associated physical data file, the processor further being, to transmit the create file event including the selected hard link file name and the content of the associated physical data file through the network interface over the network to the replica server.

15. The data processing node of claim 12 wherein the processor circuit compares by determining that a selected hard link file name is included in the replica server hard link file snapshot and that the selected hard link file name is not included in the master server hard link file snapshot, and wherein the processor generates a remove hard link file event to remove the selected hard link file name from the replica server, the processor further being, to transmit the remove hard link file event through the network interface over the network to the replica server.

16. The data processing node of claim 12 wherein the processor circuit compares by determining that a selected hard link file name is included in both the master server hard link file snapshot and the replica server hard link file snapshot and that a group identification corresponding to the selected hard link file name is included in the synchronized hash map linked list, and wherein the processor circuit generates by adding the selected hard link file name to the synchronized hash map linked list for the group identification corresponding to the selected hard link file name.

17. The data processing node of claim 12 wherein the processor circuit compares by determining that a selected hard link file name is included in both the master server hard link file snapshot and the replica server hard link file snapshot and that a group identification corresponding to the selected hard link file name is not included in the synchronized hash map linked list, and wherein the processor circuit generates by adding the group identification corresponding to the selected hard link file name and adding the selected hard link file name to the synchronized hash map linked list.

18. The data processing node of claim 12 wherein the replica server hard link file snapshot includes at least one of the first group identification and/or the second group identification.

19. The method of claim 1 further comprising:
catching a change regarding a hard link file name from the root directory of the master server; and
responsive to catching the change, updating the synchronized hash map file linked list.

20. The data processing node of claim 12 the processor circuit being,
to catch a change regarding a hard link file name from the root directory of the master server; and
to update the synchronized hash map file linked list responsive to catching the change.

* * * * *